United States Patent
Su

(10) Patent No.: US 8,222,850 B2
(45) Date of Patent: Jul. 17, 2012

(54) OVERLOAD PROTECTION DEVICE FOR MOTOR

(75) Inventor: Xiao-Guang Su, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 510 days.

(21) Appl. No.: 12/547,490

(22) Filed: Aug. 26, 2009

(65) Prior Publication Data

US 2010/0320952 A1 Dec. 23, 2010

(30) Foreign Application Priority Data

Jun. 22, 2009 (CN) .......................... 2009 1 0303491

(51) Int. Cl.
*H02H 7/08* (2006.01)
*H02K 11/00* (2006.01)
*H02P 3/00* (2006.01)

(52) U.S. Cl. .................... 318/475; 310/68 B; 310/75 R; 310/79; 192/150

(58) Field of Classification Search ............... 310/68 B, 310/68 E, 75 R, 75 D, 78–79, 83; 340/648; 464/55, 61.1, 37, 41, 56; 477/178; 192/150, 192/56.1, 56.5; 318/434, 475
See application file for complete search history.

(56) References Cited

U.S. PATENT DOCUMENTS

| 1,719,517 | A | * | 7/1929 | Moore, Jr. ................. 192/129 A |
| 2,461,261 | A | * | 2/1949 | Drisko ............................. 318/9 |
| 2,730,666 | A | * | 1/1956 | Cohen et al. .................. 318/475 |
| 2,864,912 | A | * | 12/1958 | Schmidt .......................... 335/69 |
| 4,320,317 | A | * | 3/1982 | Bowey ........................ 310/68 B |
| 4,823,063 | A | * | 4/1989 | Barba et al. .................. 318/689 |

FOREIGN PATENT DOCUMENTS

JP          2006-149101    *   6/2006
* cited by examiner

*Primary Examiner* — Burton Mullins
(74) *Attorney, Agent, or Firm* — Altis Law Group, Inc.

(57) ABSTRACT

An overload protection device includes a motor, a transmitting shaft, a driving wheel, a resilient member, a sensor and a controller. The transmitting shaft including driving arm is meshed with the motor. The driving wheel is rotably engaged with the transmitting shaft at a distal end. The resilient member is connected to the driving arm at one end, and connected to the driving wheel at another end for driving the driving wheel to rotate. The sensor is mounted on the driving wheel and covered by the driving arm, and configured for and outputting a signal when the transmitting shaft is rotated relative to driving wheel. The controller is installed in the transmitting shaft and electrically coupled with the sensor for receiving the signal outputted from the sensor and shutting down the motor correspondingly.

18 Claims, 2 Drawing Sheets

OVERLOAD PROTECTION DEVICE FOR MOTOR

BACKGROUND

1. Technical Field

The disclosure relates to overload protection devices, and more particularly, to an overload protection device for a motor.

2. Description of Related Art

Electric machines, for example electric motors, commonly contain thermal circuit breakers, which protect the electric machines from being damaged in the event that the movements of the electric machines become jammed or restricted. Generally, fuses are used for this purpose, which are coupled in circuits of the electric motors. When a motor is overloaded, the current in the circuit of the motor increases and induces the temperature of the circuit increasing rapidly, as a result the fuse in the circuit will melt and the circuit is permanently broken thereby to protect the electrical motor. When the overloading condition is eliminated, the circuit of the motor needs to be repaired and rebuilt by a new fuse, which is timeconsuming, and inconvenient.

Therefore, what is needed is to provide an overload protection device for a motor which can eliminate or at least meliorate above problem.

DETAILED DESCRIPTION

Figure 1:
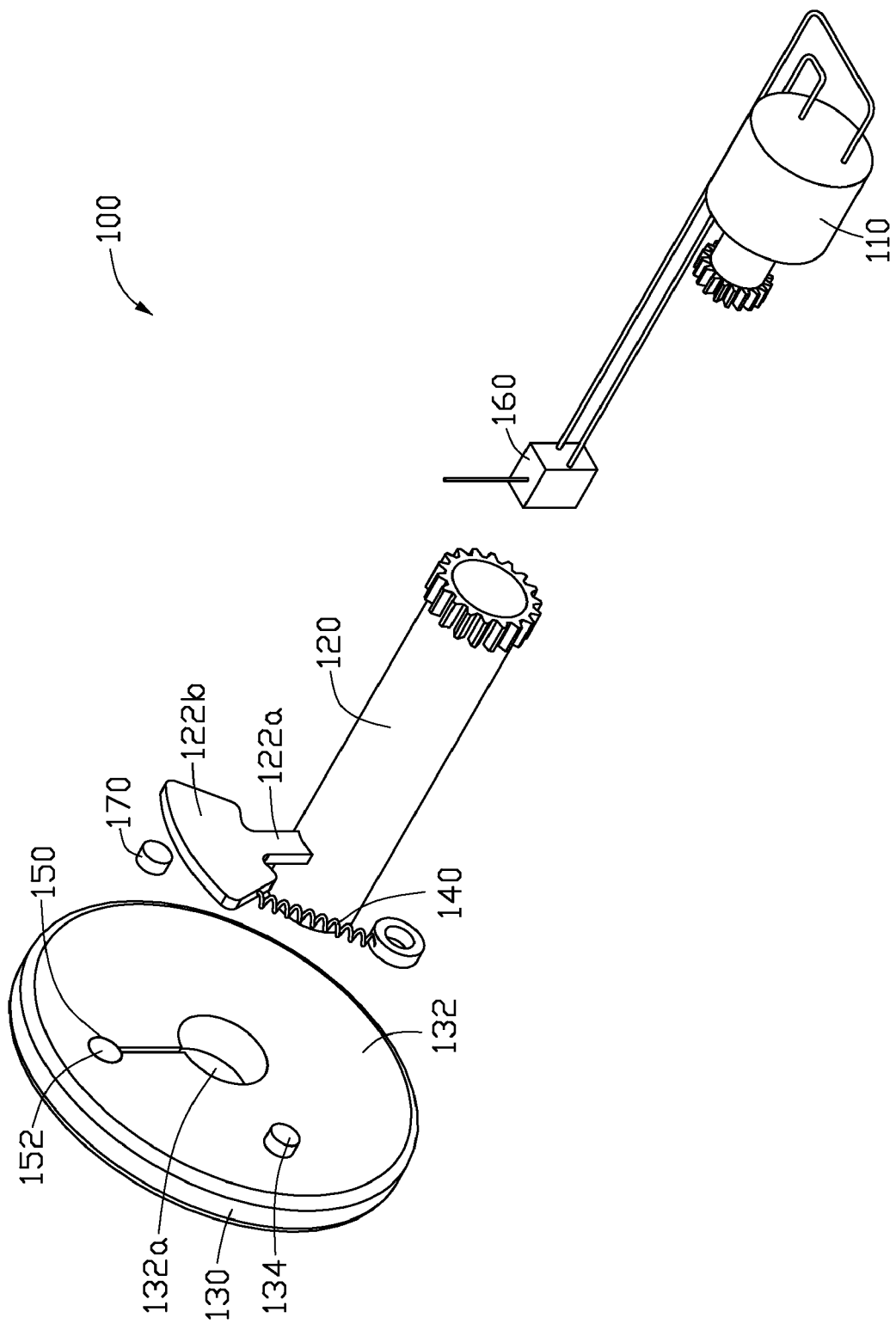
FIG. 1 is an exploded, isometric view of an overload protection device according to an exemplary embodiment of present invention.
Figure 2:
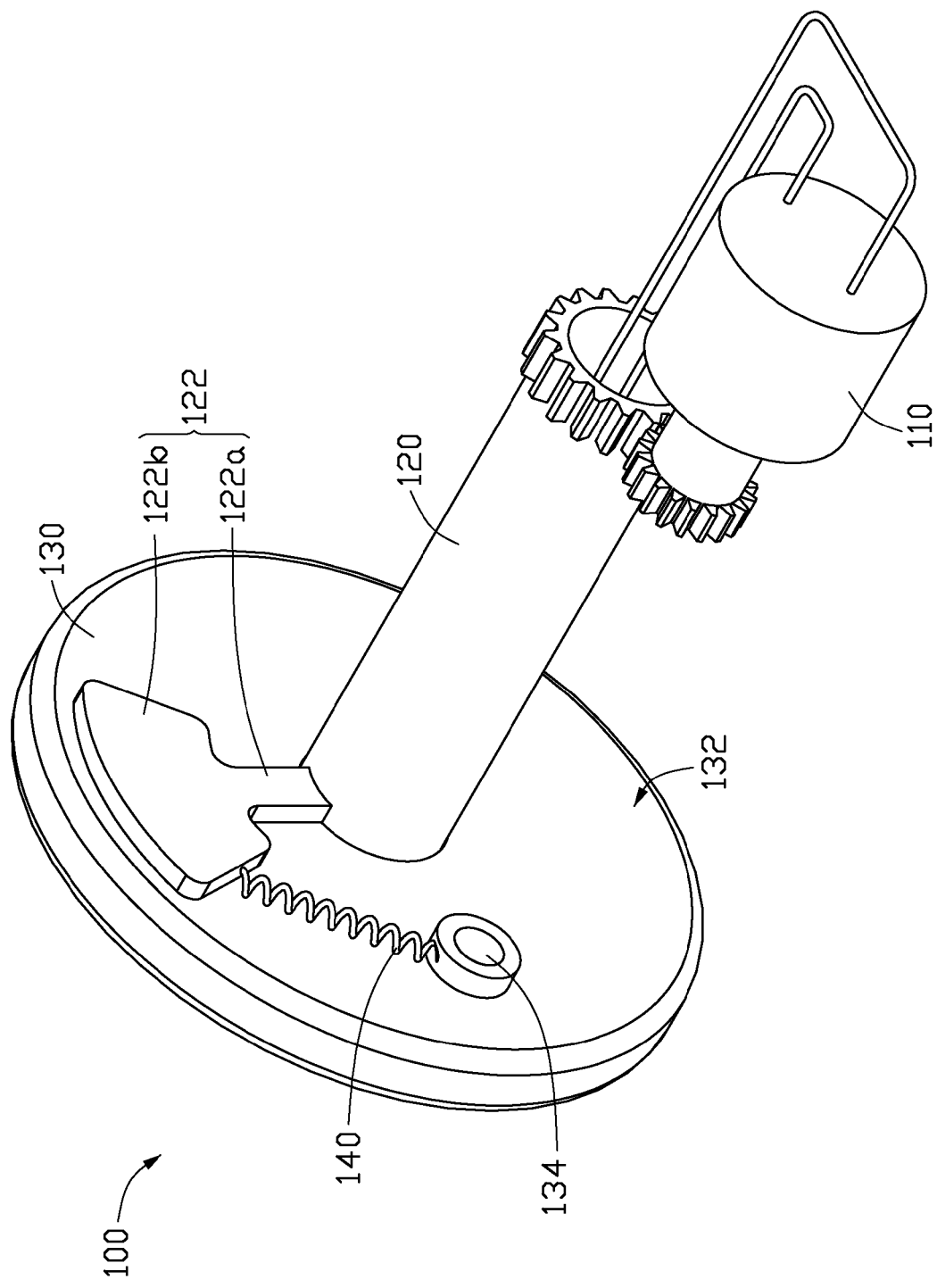
FIG. 2 is an assembled, isometric view of the overload protection device of FIG. 1.

Referring to FIGS. 1 and 2, an overload protection device 100 according to an exemplary embodiment of present invention is shown. The overload device 100 includes a motor 110, a transmitting shaft 120, a driving wheel 130, a resilient member 140, a sensor 150, and a controller 160. The transmitting shaft 120 is meshed with the motor 110 for transmitting a torque produced by the motor 110 and includes a driving arm 122 perpendicularly extending from the transmitting shaft 120 along a radial direction of the transmitting shaft 120. The driving wheel 130 is rotatably engaged with the transmitting shaft 120 at a distal end of the transmitting shaft 120 apart from the motor 110. The driving wheel 130 is used to carry loads. The resilient member 140 is connected to a distal end of the driving arm 122 at one end, and connected to a periphery portion of the driving wheel 130 at another end. When the motor 110 overloads, the driving wheel 130 will fail to catch up with the rotational speed of the transmitting shaft 120, and therefore the transmitting shaft 120 will rotate relative to the driving wheel 130. The sensor 150 is mounted on the driving wheel 130 and covered by the driving arm 122 of the transmitting shaft 120. The sensor 150 is configured for detecting whether a phase shift occurs between the driving wheel 130 and the transmitting shaft 120, and outputting an overload signal to the controller 160 when a phase shift is detected. The controller 160 is installed in the transmitting shaft 120 and coupled with the sensor 150 for receiving the signal outputted from the sensor 150 and shutting down the motor 110 accordingly, thereby, protecting the motor 110.

The motor 110 commonly includes two components, one is an outside stationary stator (not shown) having coils (not shown) supplied with alternating current to produce a rotating magnetic field, and another is an inside rotor installed in the outside stationary stator for producing a torque under the rotating magnetic field. The motor 110 outputs the torque to rotate the transmitting shaft 120. Alternatively, the torque outputted by the motor 110 can be passed or transmitted to the transmitting shaft 120 via many steps of transmitters also called transmitting links (consisting of gears) meshed between the motor 110 and the transmitting shaft 120.

The driving arm 122 of the transmitting shaft 120 is constructed by a connecting pole 122a and a shading plate 122b. The connecting pole 122a perpendicularly protrudes from an outer side of the shaft 120 at a distal end of the shaft 120. The shading plate 122b is blade-shaped in the exemplary embodiment and connected to the shaft 120 via the connecting pole 122a.

The driving wheel 130 includes an inner surface 132 facing the transmitting shaft 120, and a fixing member 134 for holding an end of the resilient member 140. A center hole 132a is defined in a center of the inner surface 132, for receiving a distal end of the transmitting shaft 120. The fixing member 134 is protruded from the inner surface 132 and spaced away from the center hole 132a at a predetermined distance. The fixing member 134 also offsets from the driving arm 122 and an elongation line of the driving arm 122 at a second predetermined distance. A departure distance between the fixing member and the driving arm 122 is longer enough for positioning the resilient member 140 therebetween.

The resilient member 140 is connected between the shading plate 122b of the driving arm 122 and the fixing member 134 of the driving wheel 130 via its opposite ends. The resilient member 140 transmits the torque from the driving arm 122 to drive the driving wheel 130 and transmits a reaction-counter-torque to the transmitting shaft 120 when transmitting the torque to the driving wheel 130. The resilient member 140 has an equilibrium length when transmitting the torque from the driving arm 122 to drive the driving wheel 130. It is to be noted that the equilibrium length of the resilient member 140 is smaller than a distance between the fixing member 134 and the sensor 150 when the motor 110 did not overload. In generally, an absolute value of the torque is equal to that of the counter-torque when the motor is operated under its rated power. To protecting the motor 110, an absolute value of the counter-torque applied on the shaft 120 by a critical tensile force of the resilient member 140 is also configured to equal the absolute value of the torque outputted by the motor 110 when the motor 110 is operated under its rated power. The critical tensile force of the resilient member 140 is defined, in present invention, as a force required by the resilient member 140 to extend to a critical equilibrium length equaling the distance between the fixing member 134 and the sensor 150. Therefore, if a force applied on the resilient member 140 exceeds the critical tensile force, the extension length of the resilient member 140 will excess the critical equilibrium length. The resilient member 140 is a leaf spring or a helical spring.

The sensor 150 includes a sensitive surface 152 for sensing a light such as white light, infrared light or the like. In this embodiment, the sensor 150 is a light sensitive chip and shaded by the shading plate 122b. When the transmitting shaft 120 rotates relative to the wheel 130 due to overloading of the motor 110, the sensitive surface 152 of the sensor 150 is exposed out from the shading plate 122b. The sensitive surface 152 receives ambient light and correspondingly generates and outputs a signal. Alternatively, the sensor 150 can also be mounted under the shading plate 122b, and a radial ray source 170 is mounted on the driving wheel 130 facing the sensor 150. The radial ray source 170 emits light towards the sensor 150. When the transmitting shaft 120 is rotates relative to the wheel 130 when the motor 110 overloads, the sensor 150 and the radial ray source 170 offset each other, and therefore the sensor 150 cannot receive light from the radial ray source 170.

The controller 160 is installed in the transmitting draft 120 and electrically coupled with the sensor 150 and a controlling circuit of the motor 110 for receiving the signal outputted from the sensor 150 and correspondingly shutting down the power supply of the motor 110.

In use, when the motor 110 overloads, the torque applied on the transmitting shaft 120 by the motor 110 becomes larger than the counter-torque of the critical tensile force of the resilient member 140 pulling the transmitting shaft 120. As a result, the phase angle between the transmitting shaft 120 and the 130 changes. The sensor 150 senses the phase shift between the transmitting shaft 120 and the wheel 130 and correspondingly outputs a signal to the controller 160. The controller 160 then shuts down the power supply of the motor 110. When the motor 110 is no longer overloaded, the resilient member 140 rebounds to its original shape, the driving arm 122 covers the sensor 150 again, and the motor 110 is supplied power again.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An overload protection device comprising:
   a motor,
   a transmitting shaft meshed with the motor and comprising a driving arm perpendicularly extending from the transmitting shaft;
   a driving wheel rotatably engaged with the transmitting shaft at a distal end of the transmitting shaft apart from the motor;
   a resilient member connected to the driving arm at one end, and connected to the driving wheel at another end, for driving the driving wheel to rotate;
   a sensor mounted on the driving wheel and covered by the driving arm, and configured for detecting whether a phase shift occurs between the transmitting shaft and the driving wheel, and outputting a signal when a phase shift occurs between the transmitting shaft and the driving wheel; and
   a controller installed in the transmitting shaft and coupled with the sensor, for receiving the signal outputted from the sensor and shutting down the motor accordingly.

2. The overload protection device as claimed in claim 1, wherein an absolute value of a counter-torque applied on the shaft by a critical tensile force of the resilient member is configured equal to that of a torque outputted by the motor when the motor is operated under a rated power.

3. The overload protection device as claimed in claim 2, wherein a critical equilibrium length of the resilient member under the critical tensile force is equal to a distance between the fixing member and the sensor.

4. The overload protection device as claimed in claim 2, wherein the driving arm comprises a connecting pole perpendicularly extending from an outer side of the shaft at a distal end of the transmitting shaft, and a shading plate connected to the shaft via the connecting pole.

5. The overload protection device as claimed in claim 4, wherein the sensor is shaded by the shading plate.

6. The overload protection device as claimed in claim 5, wherein the sensor comprises a sensitive surface for sensing radial rays; the sensor detects whether the phase shift occurs between the transmitting shaft and the driving wheel by the sensitive surface, and outputs the signal when the sensitive surface exposes from the shading plate and senses ambient rays.

7. The overload protection device as claimed in claim 4, wherein the shading plate is blade-shaped.

8. The overload protection device as claimed in claim 4, wherein the resilient member is connected to a distal end of the driving arm, and to a periphery portion of the driving wheel.

9. The overload protection device as claimed in claim 4, wherein driving wheel includes an inner surface facing the transmitting shaft, a center hole defined in the center of the inner surface, and a fixing member extending from the inner surface and spacing away from the center hole by a distance; the driving wheel is rotatably installed on the transmitting shaft via the center hole.

10. The overload protection device as claimed in claim 7, wherein the fixing member is offset from the driving arm and an elongation line of the driving arm at certain distances; the resilient member is connected to the shading plate of the driving arm and the fixing member of the driving wheel at opposite ends thereof.

11. The overload protection device as claimed in claim 8, wherein a departure distance between the fixing member and the driving arm is long enough for positioning the resilient member.

12. The overload protection device as claimed in claim 3, wherein the sensor is a light sensitive chip.

13. The overload protection device as claimed in claim 3, wherein the resilient member is a helical spring or a leaf spring.

14. An overload protection device for a motor comprising:
    a transmitting shaft meshed with the motor and comprising a driving arm perpendicularly extending from the transmitting shaft;
    a driving wheel rotatably engaged with the transmitting shaft at a distal end of the transmitting shaft apart from the motor;
    a resilient member connected to an distal end of the driving arm at one end, and connected to a periphery portion of the driving wheel at another end, for driving the driving wheel to rotate;
    a radial ray source attached on the driving wheel and configured for emitting rays;
    a sensor installed on the driving arm corresponding to the radial ray source and configured for sensing the rays emitted by the radial ray source thereby detecting whether a phase shift occurs between the transmitting shaft and the driving wheel, and outputting a signal when a phase shift occurs between the transmitting shaft and the driving wheel; and
    a controller installed in the transmitting shaft and coupled with the sensor, for receiving the signal outputted from the sensor and shutting down the motor accordingly.

15. The overload protection device as claimed in claim 14, wherein an absolute value of a counter-torque applied on the shaft by a critical tensile force of the resilient member is configured equal to that of a torque outputted by the motor when the motor is operated under a rated power.

16. The overload protection device as claimed in claim 15, wherein a critical equilibrium length of the resilient member under the critical tensile force is equal to a distance between the fixing member and the sensor.

17. The overload protection device as claimed in claim 15, wherein the driving arm comprises a connecting pole perpendicularly extending from an outer side of the shaft at a distal end of the transmitting shaft, and a shading plate connected to the shaft via the connecting pole.

18. The overload protection device as claimed in claim 15, wherein the sensor comprises a sensitive surface for sensing rays from the radial ray source; and the sensor detects whether the phase shift occurs between the transmitting shaft and the driving wheel by the sensitive surface, and outputs the signal when the sensitive surface offset from the radial ray source and fail to sense the rays of the radial ray source.

* * * * *